United States Patent
Kitajima et al.

(10) Patent No.: US 11,216,973 B2
(45) Date of Patent: Jan. 4, 2022

(54) SELF-LOCALIZATION DEVICE, SELF-LOCALIZATION METHOD, AND NON-TRANSITORY COMPUTER-READABLE MEDIUM

(71) Applicant: MITSUBISHI HEAVY INDUSTRIES, LTD., Tokyo (JP)

(72) Inventors: Katsumasa Kitajima, Tokyo (JP); Yusuke Kinouchi, Tokyo (JP); Takumi Fujita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 64 days.

(21) Appl. No.: 16/787,258

(22) Filed: Feb. 11, 2020

(65) Prior Publication Data
US 2020/0286257 A1  Sep. 10, 2020

(30) Foreign Application Priority Data
Mar. 7, 2019  (JP) .............................. JP2019-041991

(51) Int. Cl.
*G06T 7/73* (2017.01)
*G06T 7/246* (2017.01)
*G06T 3/00* (2006.01)

(52) U.S. Cl.
CPC .............. *G06T 7/74* (2017.01); *G06T 3/0068* (2013.01); *G06T 7/246* (2017.01); *G06T 2207/30252* (2013.01)

(58) Field of Classification Search
CPC ......... G06T 3/0068; G06T 7/20; G06T 7/246; G06T 7/248; G06T 7/33; G06T 7/337;
(Continued)

(56) References Cited

U.S. PATENT DOCUMENTS

2018/0253861 A1*  9/2018  Moteki et al. .......... G06T 7/174
2019/0257659 A1*  8/2019  Moteki et al. .......... G01C 21/32
(Continued)

FOREIGN PATENT DOCUMENTS

| EP | 3 343 307 A1 | 7/2018 | ............... G05D 1/02 |
| JP | 2012-248032 A | 12/2012 | ............... G05D 1/02 |

(Continued)

OTHER PUBLICATIONS

Adi Sujiwo, Eijiro Takeuchi, Luis Yoichi Morales, Naoki Akai, Yoshiki Ninomiya and Masato Edahiro, "Localization Based on Multiple Visual-Metric Maps" in Proc of IEEE International Conference on Multisensor Fusion and Integration for Intelligent Systems, 2017.

*Primary Examiner* — Andrew W Johns
(74) *Attorney, Agent, or Firm* — Wenderoth, Lind & Ponack, L.L.P.

(57) ABSTRACT

The self-localization device includes: an acquisition unit configured to acquire a sight image from a camera which is mounted in a mobile object; an estimation unit configured to perform a self-localization process of estimating a position and a posture of the mobile object in a world coordinate system on the basis of positions of feature points in the sight image and a map on which positions of a plurality of feature points in the world coordinate system are recorded; and a registration unit configured to register the sight image as a key frame for adding a new feature point included in the sight image to the map. The registration unit is configured to register the sight image as the key frame when movement of the mobile object satisfies a condition which is prescribed for at least one of the position and the posture of the mobile object.

16 Claims, 12 Drawing Sheets

(58) Field of Classification Search
CPC .... G06T 7/70; G06T 7/73; G06T 7/74; G06T 2207/30244; G06T 2207/30252; G06K 9/00791; G01C 21/005; G01C 21/38; G01C 21/3804; G01C 21/3807; G01C 21/3811
See application file for complete search history.

(56) References Cited

U.S. PATENT DOCUMENTS

| | | | | |
|---|---|---|---|---|
| 2020/0143603 A1* | 5/2020 | Kotake et al. | ....... | G01B 21/045 |
| 2020/0158517 A1* | 5/2020 | Tadi et al. | ............... | G01C 21/32 |
| 2020/0191975 A1* | 6/2020 | Watanabe et al. | ........ | G06T 7/73 |
| 2020/0263994 A1* | 8/2020 | Lee et al. | ................... | G06T 7/74 |
| 2020/0333162 A1* | 10/2020 | Wang et al. | ......... | G01C 21/383 |
| 2021/0012142 A1* | 1/2021 | Yamaguchi | .......... | H04N 5/2353 |

FOREIGN PATENT DOCUMENTS

| | | | | |
|---|---|---|---|---|
| JP | 2018-124787 A | 8/2018 | ............... | G06T 1/00 |
| WO | 2017/038012 A1 | 3/2017 | ............... | G05D 1/02 |

* cited by examiner

FIG. 3

<KEY FRAME TABLE>

| KEY FRAME NUMBER | SIGHT IMAGE | POSITION OF FEATURE POINT IN IMAGE | CORRESPONDING FEATURE POINTS ON MAP | POSITION, POSTURE OF MOBILE OBJECT | CONVERSION MATRIX |
|---|---|---|---|---|---|
| ⋮ | ⋮ | ⋮ | ⋮ | ⋮ | ⋮ |
| n−1 | IMAGE DATA | q1_n−1 (px, py), q2_n−1 (px, py), q3_n−1 (px, py), ⋮ | Q1 (X, Y, Z), Q2 (X, Y, Z), Q3 (X, Y, Z), ⋮ | Pn−1 (X, Y, Z), An−1 ($\theta$x, $\theta$y, $\theta$z) | Tn−1 |
| n | IMAGE DATA | q1_n (px, py), q2_n (px, py), q3_n (px, py), ⋮ | Q2 (X, Y, Z), Q4 (X, Y, Z), Q5 (X, Y, Z), ⋮ | Pn (X, Y, Z), An ($\theta$x, $\theta$y, $\theta$z) | Tn |
| n+1 | IMAGE DATA | q1_n+1 (px, py), q2_n+1 (px, py), q3_n+1 (px, py), ⋮ | Q4 (X, Y, Z), Q6 (X, Y, Z), Q7 (X, Y, Z), ⋮ | Pn+1 (X, Y, Z), An+1 ($\theta$x, $\theta$y, $\theta$z) | Tn+1 |
| ⋮ | ⋮ | ⋮ | ⋮ | ⋮ | ⋮ |

FIG. 7
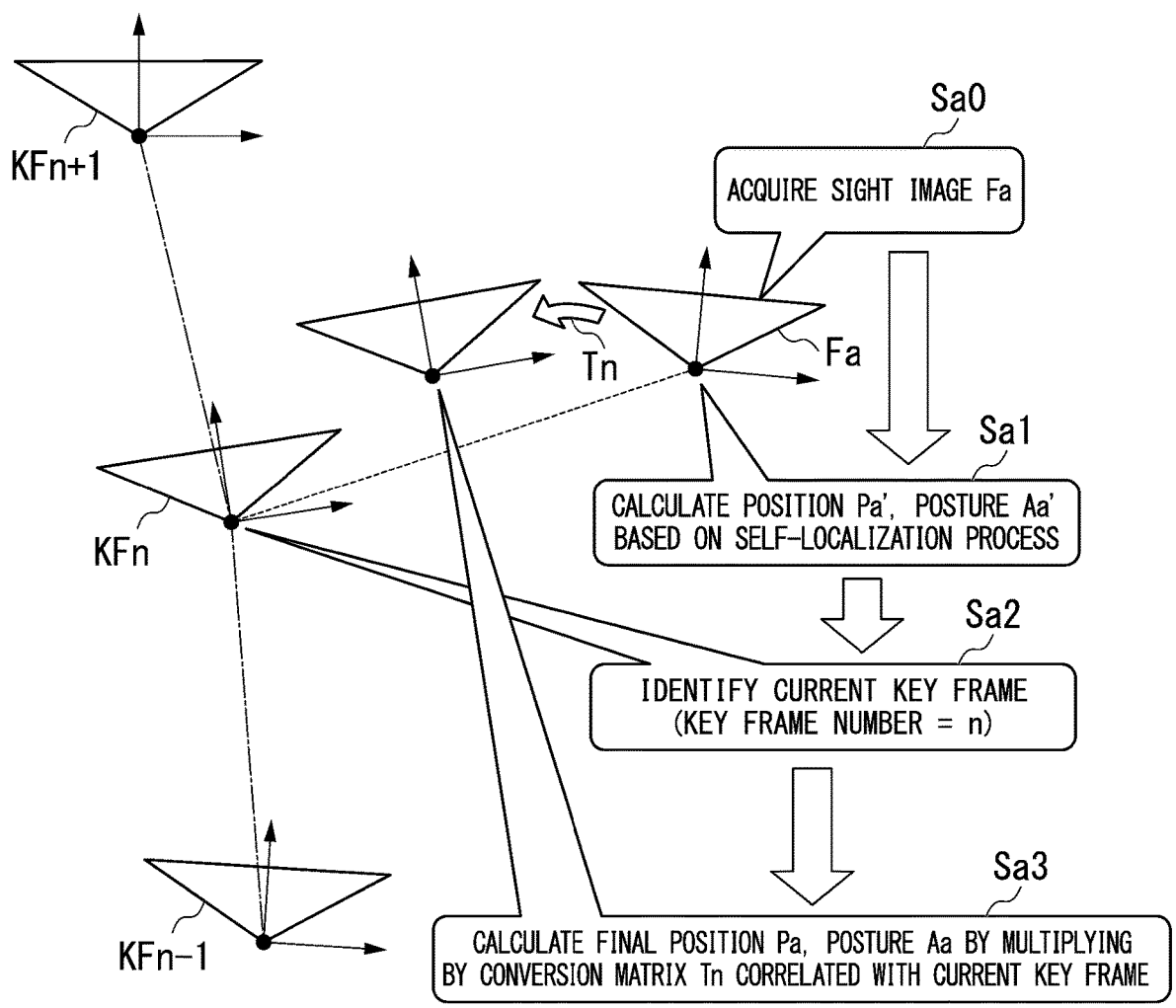
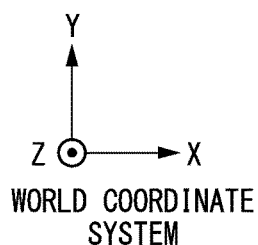
WORLD COORDINATE SYSTEM

SELF-LOCALIZATION DEVICE, SELF-LOCALIZATION METHOD, AND NON-TRANSITORY COMPUTER-READABLE MEDIUM

TECHNICAL FIELD

The present disclosure relates to a self-localization device, a self-localization method, and a non-transitory computer-readable medium. Priority is claimed on Japanese Patent Application No. 2019-041991, filed Mar. 7, 2019, the content of which is incorporated herein by reference.

BACKGROUND ART

A technique of detecting a position and a posture of a mobile object with high accuracy and performing steering control of the mobile object using a result of detection of the position and the posture is known.

Patent Literature 1 discloses a technique of estimating a self-position on the basis of inputs from different sensors.

Laser detection and ranging (LiDAR) is known as a technique for detecting a position and a posture of a mobile object with high accuracy, and this technique requires mounting of an expensive sensor (a laser scanner). On the other hand, a self-localization technique using a camera which is a relatively inexpensive sensor has been developed.

Non-Patent Literature 1 discloses a technique of performing self-localization with high accuracy, in which the LiDAR is used for only mapping a map and only the camera is used for actual operation, on the basis of ORB-simultaneous localization and mapping (ORB-SLAM) which is a self-localization technique using a camera.

CITATION LIST

Patent Literature

[Patent Document 1] Japanese Unexamined Patent Application, First Publication No. 2012-248032

Non-Patent Literature

[Non-Patent Literature 1] Adi Sujiwo, Eijiro Takeuchi, Luis Yoichi Morales, Naoki Akai, Yoshiki Ninomiya and Masato Edahiro, "Localization Based on Multiple Visual-Metric Maps" in Proc of IEEE International Conference on Multisensor Fusion and Integration for Intelligent Systems, 2017.

SUMMARY

In a map preparing process based on ORB-SLAM, a map in which positions of a plurality of feature points on the world coordinate system and on which a plurality of key frames which are sight images (frames) obtained by observing the feature points are recorded is prepared. Positions and postures of a camera at the time of acquiring the key frames which are estimated through a self-localization process based on ORB-SLAM are also recorded on the map.

In the self-localization process based on ORB-SLAM, by matching the feature points observed in a sight image (a frame) acquired from the camera with the feature points recorded on the map, the position and the posture of the camera in the world coordinate system at the time of acquiring the sight image are estimated. At this time, by identifying a key frame with a positional relationship of the feature points closest to those in the sight image acquired from the camera (a current key frame) and using the current key frame as a foothold, it is possible to achieve an increase in speed of the self-localization.

When the number of feature points matching between the feature points observed in the sight image acquired from the camera and the feature points recorded on the map is small (that is, the feature points recorded on the map hardly appear in the acquired sight image), or the like, it is known that the self-localization process fails and the self-position and the self-posture are lost. In ORB-SLAM, there is demand for stably performing a self-localization process without losing the self-position and the self-posture.

An objective of at least one aspect of the present disclosure is to provide a self-localization device, a self-localization method, and a non-transitory computer-readable medium that can achieve stabilization of a self-localization process using a camera.

According to an aspect of the present disclosure, there is provided a self-localization device including: an acquisition unit configured to acquire a sight image from a camera which is mounted in a mobile object; an estimation unit configured to perform a self-localization process of estimating a position and a posture of the mobile object in a world coordinate system on the basis of positions of feature points in the sight image and a map on which positions of a plurality of feature points in the world coordinate system are recorded; and a registration unit configured to register the sight image as a key frame for adding a new feature point included in the sight image to the map. The registration unit is configured to register the sight image as the key frame when movement of the mobile object satisfies a condition which is prescribed for at least one of the position and the posture of the mobile object.

According to the above-mentioned aspects of the present disclosure, it is possible to achieve stabilization of a self-localization process using a camera.

BRIEF DESCRIPTION OF DRAWINGS

FIG. 3 is a diagram illustrating an example of a key frame table according to the first embodiment.

FIG. 7 is a diagram illustrating a process flow which is performed at the time of actual operation by the self-localization device according to the first embodiment.

DESCRIPTION OF EMBODIMENTS

First Embodiment

Hereinafter, a self-localization device according to a first embodiment and a mobile object including the self-localization device will be described with reference to FIGS. 1 to 7.

Entire Configuration of Forklift

Figure 1:
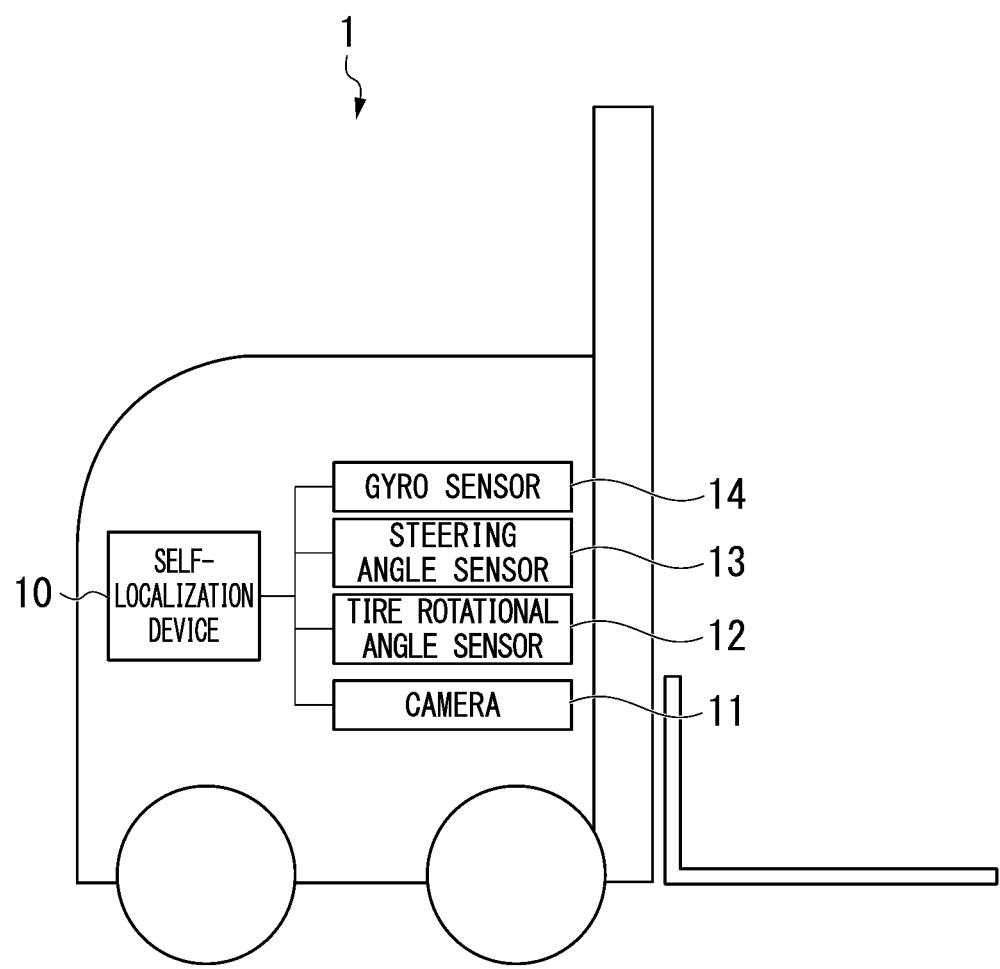
FIG. 1 is a diagram illustrating the entire configuration of a forklift according to a first embodiment.

FIG. 1 is a diagram illustrating the entire configuration of a forklift according to the first embodiment.

The forklift 1 illustrated in FIG. 1 is an example of a mobile object and is an unmanned forklift which travels autonomously to a target point along a predetermined route.

The forklift 1 includes a self-localization device 10, a camera 11, a tire rotational angle sensor 12, a steering angle sensor 13, and a gyro sensor 14.

The self-localization device 10 performs a self-localization process based on ORB-SLAM. Specifically, a position and a posture of the forklift 1 are estimated on the basis of an image acquired from the camera 11 (hereinafter also referred to as a sight image). The detailed configuration and function of the self-localization device 10 will be described later.

The camera 11 is an imaging device that can capture a moving image, that is, can consecutively acquire sight images. One sight image corresponds to a "frame" constituting a moving image. The camera 11 in this embodiment is "monocular," but may be "compound-eye type" in another embodiment.

The tire rotational angle sensor 12 is a sensor that can detect a tire rotational angle of the forklift 1.

The steering angle sensor 13 is a sensor that can detect a steering angle of a tire. By combining the result of detection of a steering angle from the steering angle sensor 13 with the result of detection of a tire rotational angle from the tire rotational angle sensor 12, a relative position of the forklift 1 after it has moved from a certain position can be identified.

The gyro sensor 14 is a sensor that can detect a rotational angular velocity of the forklift 1.

In the forklift 1 according to this embodiment, a laser scanner (which is not illustrated in FIG. 1) is mounted at the time of preparation of a map which is performed before actual operation of the forklift 1 is performed. The laser scanner is detached therefrom at the time of actual operation of the forklift 1 (when the forklift 1 travels while performing a self-localization process based on ORB-SLAM using the prepared map).

The laser scanner is a sensor that is used for LiDAR and is a sensor that can measure distances from structures which are disposed around the laser scanner on the basis of reflection of a laser beam which scans a wide range. By LiDAR-SLAM which is SLAM using the distance measuring in a wide range acquired by the laser scanner, it is possible to estimate a position and a posture of the forklift 1 with higher accuracy than that in the self-localization process based on ORB-SLAM.

The forklift 1 according to this embodiment includes a steering control device (which is not illustrated in FIG. 1) that performs steering control on the basis of the results of the self-localization process based on ORB-SLAM which are output from the self-localization device 10. The steering control device performs steering control, for example, by feedback control based on the position and the posture of the forklift 1 which are estimated by the self-localization device 10.

Functional Configuration of Forklift

Figure 2:
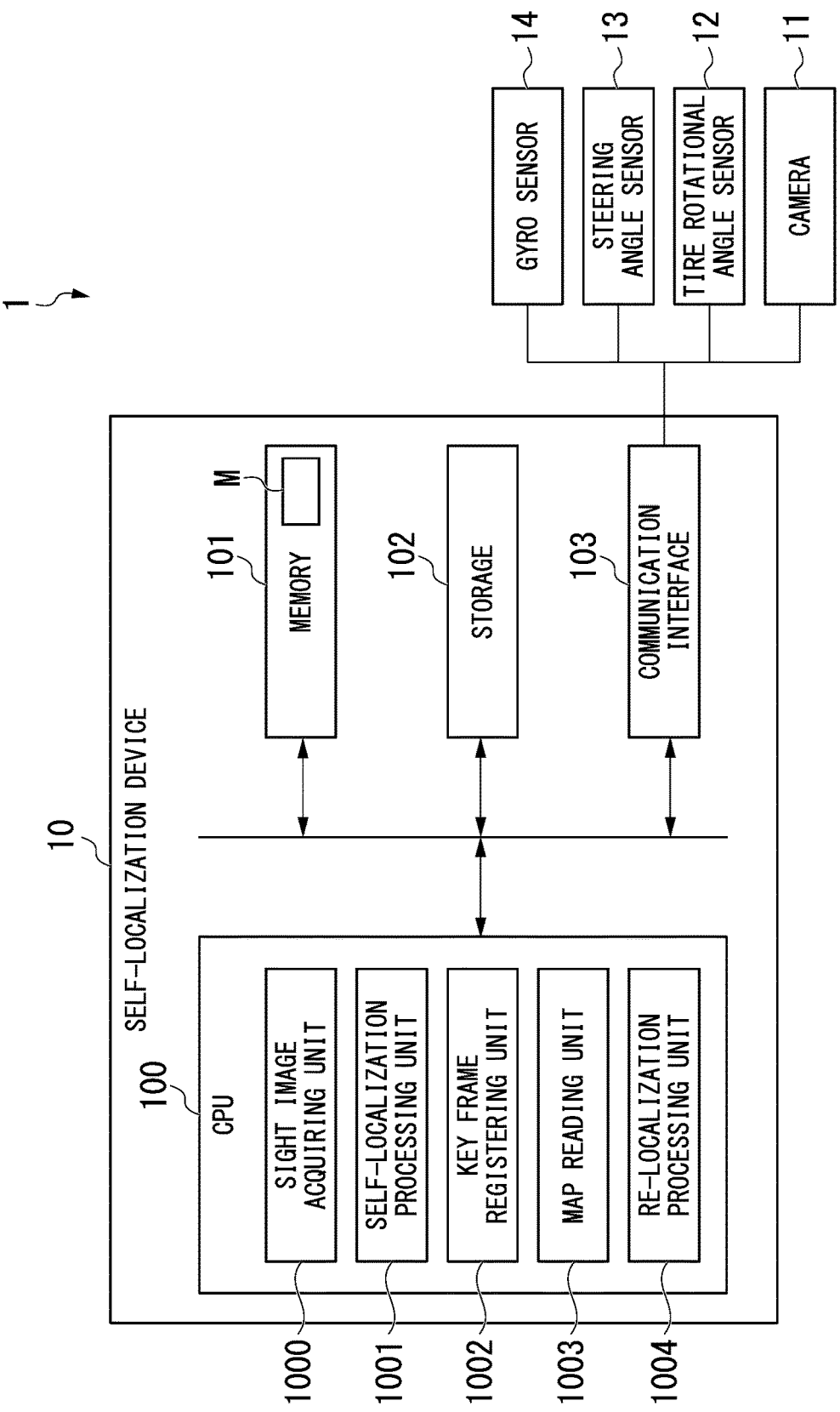
FIG. 2 is a diagram illustrating a functional configuration of a self-localization device according to the first embodiment.

FIG. 2 is a diagram illustrating the functional configuration of the self-localization device according to the first embodiment.

As illustrated in FIG. 2, the self-localization device 10 includes a CPU 100, a memory 101, a storage 102, and a communication interface 103.

The CPU 100 is a processor that takes charge of the entire operations of the self-localization device 10 and performs various functions by operating in accordance with a predetermined program.

The memory 101 is a so-called main storage device such as a DRAM and is a storage area which is required for the CPU 100 to operate at a high speed in accordance with a program.

The storage 102 is a so-called auxiliary storage device such as an HDD or an SSD, and information required for processing of the self-localization device 10 is recorded in advance therein.

The communication interface 103 is a connection interface that communicates with the camera 11, the tire rotational angle sensor 12, the steering angle sensor 13, the gyro sensor 14, and the like.

The functions of the CPU 100 will be described below in detail.

The CPU 100 performs the functions of a sight image acquiring unit 1000 (an acquisition unit), a self-localization processing unit 1001 (an estimation unit), a key frame registering unit 1002 (a registration unit), a map reading unit 1003 (a reading unit), and a re-localization processing unit 1004 (a processing unit) by operating in accordance with a predetermined program.

The sight image acquiring unit 1000 sequentially acquires sight images which are frames of a moving image from the camera 11 which is mounted in the forklift 1.

The self-localization processing unit 1001 performs a self-localization process based on ORB-SLAM. Specifically, the self-localization processing unit 1001 estimates a position and a posture of the forklift 1 (the camera 11) in the world coordinate system on the basis of positions of feature points in a sight image acquired from the camera 11 and a map M on which positions of a plurality of feature points in the world coordinate system are recorded.

The key frame registering unit 1002 registers a sight image which satisfies a specific condition out of the sight images acquired from the camera 11 as a key frame at the time of preparation of a map. A key frame is selected as a frame for adding a feature point observed in the sight image (the frame) to the map M.

The map reading unit 1003 reads the map M onto the memory 101.

The re-localization processing unit 1004 performs re-localization when the self-localization process based on ORB-SLAM by the self-localization processing unit 1001 fails. Re-localization is a process of searching for a key frame which is similar to a sight image acquired at the present time and achieving a return.

Example of Key Frame Table

FIG. 3 is a diagram illustrating an example of a key frame table according to the first embodiment.

The key frame registering unit 1002 registers a sight image which satisfies a predetermined condition as a key frame in the key frame table at the time of preparation of a map.

As illustrated in FIG. 3, the key frame table includes a "key frame number," a "sight image," a "position of a feature point in an image," a "corresponding feature point on a map," a "position and posture of a mobile object," and a "conversion matrix" which are recorded in correlation with each other.

The "key frame number" is an identification number which is allocated to identify a key frame.

The "sight image" is image data of the sight image itself. In another embodiment, image data of a sight image is not limited to being merely recorded, but may be recorded in another format which has a smaller capacity than the image data and which is suitable for measuring a degree of similarity between images. For example, the image data may be statistical information of a feature vector which is called Bag of Words (BoW).

The "position of a feature point in an image" is a position in an image of a feature point observed in the sight image (a position identified by pixel coordinates (px, py)). In the key frame table illustrated in FIG. 3, for example, feature points q1_n, q2_n, q3_n, . . . are observed in a key frame (a sight image) with a key frame number "n" and are identified at positions (px, py) in the sight image.

The "corresponding feature point on a map" represents a feature point on the map M corresponding to the feature point observed in the key frame. In the key frame table illustrated in FIG. 3, for example, the feature points q1_n, q2_n, q3_n, . . . observed in a key frame (a sight image) with a key frame number "n" correspond to feature points Q2, Q4, Q5, . . . which are plotted in the world coordinate system of the map M, respectively. The feature points Q2, Q4, Q5, . . . on the map M are defined by world coordinate values (X, Y, Z).

The "position and posture of a mobile object" represents a position and a posture on the map M of the forklift 1 (the camera 11) when each key frame is acquired. In the key frame table illustrated in FIG. 3, for example, the position Pn(X, Y, Z) and the posture An(θx, θy, θz) of the forklift 1 when the key frame with a key frame number "n" is acquired are recorded. As will be described later, the position Pn(X, Y, Z) and the posture An(θx, θy, θz) of the forklift 1 which are recorded herein are not a position and a posture estimated in the self-localization process based on ORB-SLAM, but a position and a posture which are estimated in the self-localization process based on LiDAR-SLAM. Accordingly, a result with higher accuracy than the result of the self-localization process based on ORB-SLAM is obtained. In the following description, the position and the posture recorded in this field are considered as true values of the position and the posture of the forklift 1.

The "conversion matrix" is a conversion matrix for converting the result of the self-localization process based on ORB-SLAM into true values. A conversion matrix is recorded in correlation with each key frame. In the key frame table illustrated in FIG. 3, for example, a conversion matrix Tn correlated with the key frame with a key frame number "n" is recorded. The conversion matrix Tn is a conversion matrix which is calculated to correct a deviation (a difference) of the result of the self-localization process based on ORB-SLAM of the forklift 1 from the true values when the key frame with a key frame number of "n" is acquired.

Example of Map

Figure 4:
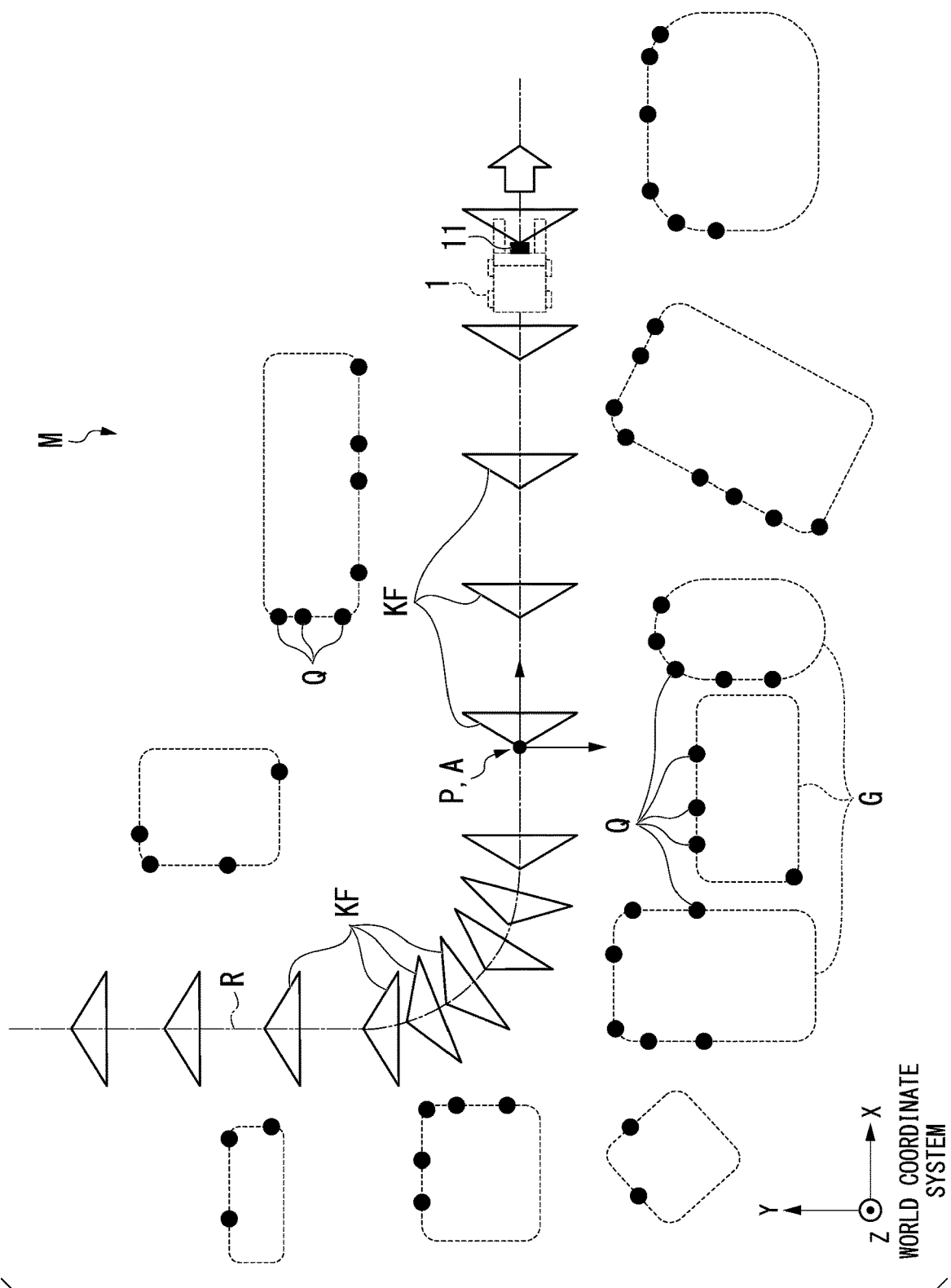
FIG. 4 is a diagram illustrating an example of a map according to the first embodiment.

FIG. 4 is a diagram illustrating an example of a map according to the first embodiment.

The map M is prepared on the basis of the key frame table (FIG. 3) and is recorded as various information groups with respect to the world coordinate system as illustrated in FIG. 4.

At the time of preparation of a map, the self-localization device 10 registers a sight image which satisfies a predetermined condition out of the sight images acquired from the camera 11 during travel on a traveling route R as a key frame KF in the key frame table (FIG. 3). Here, the traveling route R is, for example, a traveling route on which the forklift 1 is scheduled to travel at the time of actual operation of the forklift 1.

As illustrated in FIG. 4, the position P(X, Y, Z) and the posture An(θx, θy, θz) which are true values of the position and the posture of the forklift 1 at the time of acquiring each key frame KF and positions (X, Y, and Z) of feature points Q observed in the key frame KF in the world coordinate system are recorded on the map M. As described above with reference to FIG. 3, each feature point Q which is plotted in the world coordinate system is correlated with the key frame KF in which the feature point Q is observed. Structures G illustrated in FIG. 4 are structures which appear in the key frame KF. The feature points Q are observed on the basis of the structures G or the like which appear in the key frames KF.

Conversion Matrix

Figure 5:
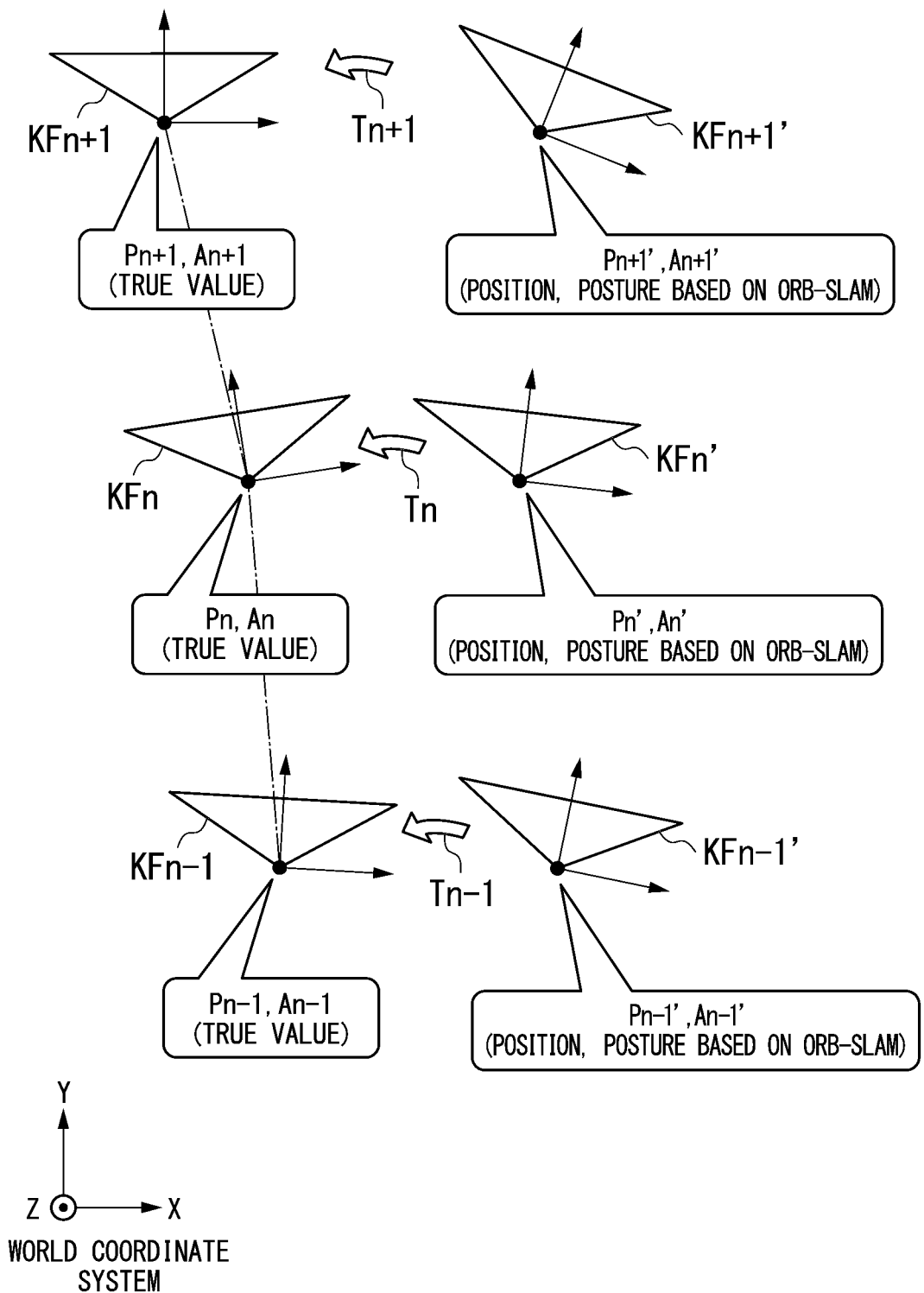
FIG. 5 is a diagram illustrating a conversion matrix according to the first embodiment.

FIG. 5 is a diagram illustrating a conversion matrix according to the first embodiment.

"Conversion matrices" (Tn−1, Tn, Tn+1, . . . ) in the key frame table illustrated in FIG. 3 can be calculated as follows.

In FIG. 5, a process which is performed when a sight image acquired at a certain time point is registered as a key frame KFn−1 in the key frame table (FIG. 3) will be described. In this case, the self-localization device 10 estimates a position and a posture of the forklift 1 at the time of acquisition of the sight image using the ORB-SLAM based on the map M under preparation. In FIG. 5, the estimation result is assumed to include a position Pn−1' and a posture An−1'. On the other hand, the self-localization device 10 can acquire true values of the position and the posture of the forklift 1 at the time of acquisition of the key frame KFn−1 using the laser scanner which is mounted at the time of preparation of a map. In FIG. 5, the true values of the position and the posture of the forklift 1 are assumed to be a position Pn−1 and a posture An−1. At the time of registration of the key frame KFn−1, the self-localization device 10 calculates a conversion matrix Tn−1 for mapping the position Pn−1' and the posture An−1' onto the position Pn−1 and the posture An−1 which are true values and records the calculated conversion matrix in the key frame table in correlation with the key frame KFn−1. At the time of registration of new key frames KFn, KFn+1, . . . , the self-localization device 10 calculates conversion matrices Tn, Tn+1, . . . corresponding to the key frames KFn, KFn+1, . . . and records the calculated conversion matrices in the key frame table.

Process Flow at Time of Preparation of Map

Figure 6:
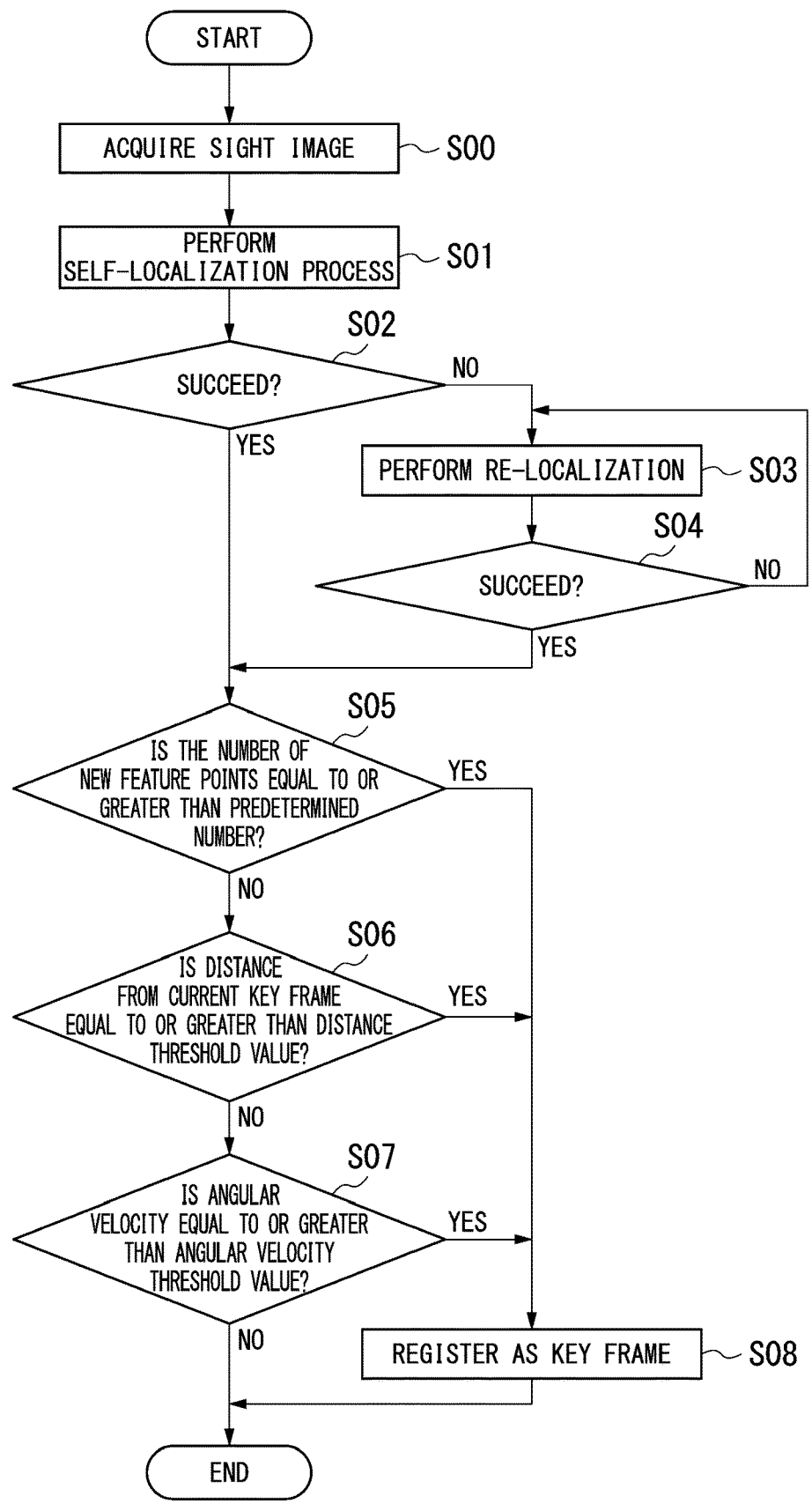
FIG. 6 is a flowchart illustrating a process flow which is performed at the time of preparation of a map by the self-localization device according to the first embodiment.

FIG. 6 is a flowchart illustrating a process flow which is performed at the time of preparation of a map by the self-localization device according to the first embodiment.

The process flow illustrated in FIG. 6 is repeatedly performed when the forklift 1 is traveling at the time of preparation of a map. At this time point, it is assumed that a map M under preparation is already read onto the memory 101.

The sight image acquiring unit 1000 of the self-localization device 10 acquires a sight image from the camera 11 (Step S00).

The self-localization processing unit 1001 of the self-localization device 10 performs a self-localization process based on ORB-SLAM on the basis of the sight image acquired in Step S00 and the map M under preparation. Here, the self-localization processing unit 1001 estimates a position and a posture of the camera in the world coordinate system at the time of acquisition of the sight image by matching feature points observed in the sight image acquired in Step S00 with feature points recorded on the map M. At this time, the self-localization processing unit 1001 identifies a key frame with a positional relationship between feature points (a current key frame) which is closest to the sight image acquired in Step S00. Then, the self-localization processing unit 1001 searches feature points matching the feature points observed in the sight image with reference to the feature points on the map correlated with the current key frame and other key frames which are consecutively previous or subsequent to the current key frame in a time series. Accordingly, it is possible to achieve an increase in processing speed of the self-localization process based on ORB-SLAM.

The self-localization processing unit 1001 determines whether the self-localization process based on ORB-SLAM has succeeded (Step S02).

When the self-localization process based on ORB-SLAM has succeeded (YES in Step S02), a process of determining whether the sight image acquired in Step S00 is to be registered as a key frame (Steps S05 to S07) is performed. Details of the process will be described later.

When the self-localization process based on ORB-SLAM has failed (NO in Step S02), the re-localization processing unit 1004 of the self-localization device 10 performs re-localization (Step S03). The re-localization processing unit 1004 according to this embodiment searches all the key frames registered in the key frame table.

The re-localization processing unit 1004 determines whether re-localization of Step S03 has succeeded (Step S04). When the re-localization has failed (NO in Step S04), the re-localization processing unit 1004 continues to perform re-localization in Step S04. When the position and the posture have been estimated by re-localization (when the re-localization has succeeded) (YES in Step S04), the self-localization device 10 performs the determination process (Steps S05 to S07).

The key frame registering unit 1002 of the self-localization device 10 determines whether the sight image acquired in Step S00 is to be registered as a key frame through the determination process of Steps S05 to S07 which will be described below.

Specifically, first, the key frame registering unit 1002 searches feature points on the map M which match the feature points observed in the sight image acquired in Step S00. Then, the key frame registering unit 1002 determines whether a predetermined number or more of new feature points (feature points which are not recorded on the map M) out of the feature points observed in the sight image acquired in Step S00 have been observed (Step S05).

When a predetermined number or more of new feature points have been observed in the sight image acquired in Step S00 (YES in Step S05), the key frame registering unit 1002 registers the sight image acquired in Step S00 as a key frame (Step S08).

When a predetermined number or more of new feature points have not been observed in the sight image acquired in Step S00 (NO in Step S05), the key frame registering unit 1002 then determines whether a position estimated in the self-localization process based on ORB-SLAM of Step S01 (or the result of re-localization of Step S03) is separated a predetermined distance threshold value or more from the position of the current key frame (Step S06).

When the position estimated in the self-localization process based on ORB-SLAM is separated the predetermined distance threshold value or more from the position of the current key frame (YES in Step S06), the key frame registering unit 1002 registers the sight image acquired in Step S00 as a key frame (Step S08).

When the position estimated in the self-localization process based on ORB-SLAM is not separated the predetermined distance threshold value or more from the position of the current key frame (NO in Step S06), the key frame registering unit 1002 then determines whether an angular velocity of the forklift 1 at the time of acquiring the sight image is equal to or greater than a predetermined angular velocity threshold value with reference to a result of detection of an angular velocity from the gyro sensor 14 (Step S07).

When the angular velocity of the forklift 1 at the time of acquiring the sight image is equal to or greater than the predetermined angular velocity threshold value (YES in Step S07), the key frame registering unit 1002 registers the sight image acquired in Step S00 as a key frame (Step S08).

When the angular velocity of the forklift 1 at the time of acquiring the sight image is not equal to or greater than the predetermined angular velocity threshold value (NO in Step S07), the key frame registering unit 1002 does not register the sight image acquired in Step S00 as a key frame and performs a next step of the process flow.

In Step S08, the key frame registering unit 1002 records a result of self-localization (a true value) based on LiDAR-SLAM instead of a result of self-localization based on ORB-SLAM of Step S01 in the key frame table. The key frame registering unit 1002 further calculates a conversion matrix using the result of self-localization based on LiDAR-SLAM and the result of self-localization based on ORB-SLAM of Step S01 and records the conversion matrix in the key frame table.

The key frame registering unit 1002 further performs a post-process such as a bundling process after the sight image has been registered as a key frame.

Process flow at time of actual operation FIG. 7 is a diagram illustrating a process flow which is performed at the time of actual operation of the self-localization device according to the first embodiment.

At the time of actual operation after the map has been completed, the self-localization device 10 performs the self-localization process based on ORB-SLAM through Steps Sa0 to Sa3 which will be described below.

First, the sight image acquiring unit 1000 acquires a sight image Fa from the camera 11 (Step Sa0).

Then, the self-localization processing unit 1001 performs the self-localization process based on ORB-SLAM on the basis of the feature points observed in the sight image Fa and the prepared map M (Step Sa1). The position and the posture of the forklift 1 which are estimated in this process are set as a position Pa' and a posture Aa'.

Then, the self-localization processing unit 1001 identifies a current key frame which is a key frame with a positional relationship of feature points closest to those in the sight image Fa acquired in Step Sa0 out of the key frames registered in the key frame table (Step Sa2). It is assumed that the current key frame which is identified herein is a key frame with a key frame number of "n" (a key frame KFn).

Then, the self-localization device 10 calculates a final position Pa and a final posture As by multiplying the position Pa' and the posture Aa' estimated using ORB-SLAM by the conversion matrix Tn which is correlated with the current key frame (the key frame KFn).

Operations and Advantages

As described above, the self-localization device 10 according to the first embodiment registers the sight image as a key frame when movement of the forklift 1 satisfies a condition which is prescribed for at least one of the position and the posture of the forklift 1, for example, as in the processes of Steps S06 and S07 in FIG. 6.

Problems which occur when the determination process of Steps S06 and S07 illustrated in FIG. 6 is not performed and only the determination process of Step S05 is performed will be described below.

That is, the determination process of Step S05 includes determining whether the sight image is to be registered as a key frame on the basis of whether a predetermined number or more of new feature points which are not registered on the map M are observed in the sight image. In this case, for example, when the forklift travels straight in the direction which the camera 11 faces, it is more difficult to observe a new feature point than in the previous key frame and thus the key frames are likely to be sparse. When the key frames are sparse, the number of feature points which are recorded on the map M decreases and thus the position and the posture of the forklift 1 are likely to be lost.

It is known that the sight changes greatly in a short time at the time of turning of the forklift 1 and thus the forklift 1 is likely to be lost. Accordingly, in order to realize stable self-localization, the key frames need to be registered at sufficiently dense intervals, particularly, in the vicinity of a position at which the forklift 1 turns.

When the key frames are sparse, the distance from the current key frame increases and thus correction accuracy of the self-localization process using a conversion matrix correlated with each key frame also decreases. Accordingly, from the viewpoint of an increase in correction accuracy using a conversion matrix, it is preferable that the key frames be registered with an appropriate density.

In the self-localization device 10 according to the first embodiment, when movement of the forklift 1 satisfies a condition which is prescribed for at least one of the position and the posture of the forklift 1, the sight image is registered as a key frame.

With this configuration, for example, when specific movement modes depending on conditions occur such as a straightly moving time of the forklift 1 at which the key frames are likely to be sparse and a turning time of the forklift at which the key frames are to be denser, the key frames are more likely to be registered than in the related art. Accordingly, key frames can be inserted at appropriate intervals corresponding to movement of the forklift 1 and the self-localization using a camera can be stabilized.

In the self-localization device 10 according to the first embodiment, as an example of the condition which is prescribed for the position of the forklift 1, the sight image is registered as a key frame when a distance between the position of the forklift 1 and one key frame (a current key frame) correlated with the position is equal to or greater than a predetermined distance threshold value (Step S06 in FIG. 6). With this configuration, even in a situation in which a new feature point is not likely to be observed such as straight movement, key frames can be registered at intervals which are equal to or less than the distance threshold value and thus it is possible to prevent the key frames from being sparse.

In the self-localization device 10 according to the first embodiment, as an example of the condition which is prescribed for the posture of the forklift 1, the sight image is registered as a key frame when an angular velocity of the forklift 1 during movement is equal to or greater than a predetermined angular velocity threshold value (Step S07 in FIG. 6).

With this configuration, when the turning angular velocity is equal to or greater than the predetermined angular velocity threshold value, the key frames are registered to be correspondingly dense and thus it is possible to prevent the forklift from being lost at the time of turning.

The order of the determination process of Steps S05 to S07 can be appropriately changed, and the present disclosure is not limited to the order illustrated in FIG. 6 in other embodiments. In another embodiment, not all of Steps S05 to S07 need to be performed and the above-mentioned advantages can be achieved by performing at least one of Steps S06 and S07.

Modified Example of First Embodiment

At the time of preparation of a map using ORB-SLAM, when a feature point included in a certain key frame is observed in sufficiently many other key frames, a thinning process of deleting the key frame may be performed from the viewpoint of a decrease in an amount of data. In order to prevent a density of key frames due to the thinning process, a self-localization device 10 according to a modified example of the first embodiment may perform the process flow illustrated in FIG. 8 at the time of preparation of a map.

Process Flow at the Time of Preparation of Map

Figure 8:
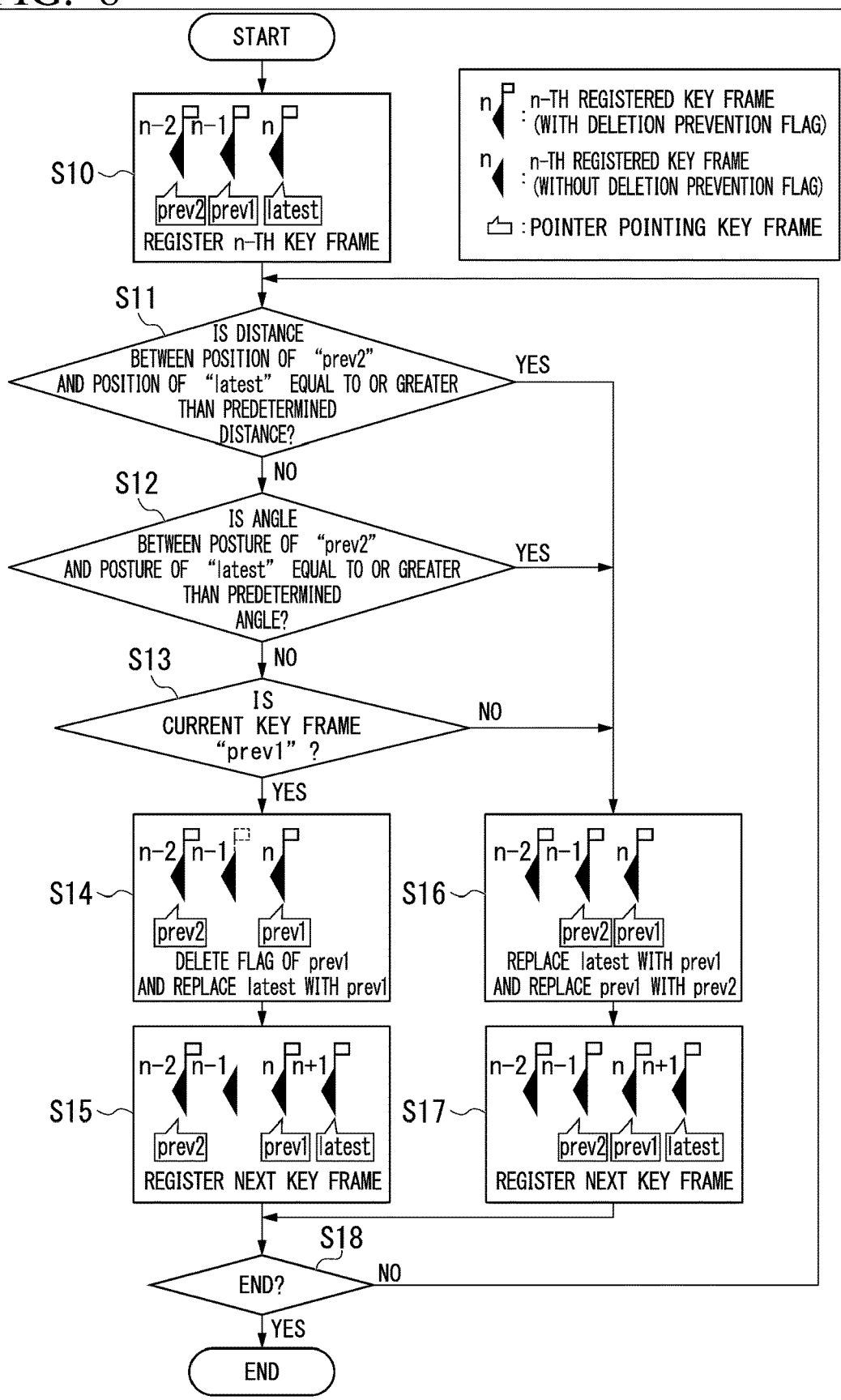
FIG. 8 is a flowchart illustrating a process flow which is performed at the time of preparation of a map by the self-localization device according to a modified example of the first embodiment.

FIG. 8 is a flowchart illustrating a process flow which is performed at the time of preparation of a map by the self-localization device according to the modified example of the first embodiment.

At the time of preparation of a map, the key frame registering unit 1002 registers an n-th key frame (Step S10). At this time, the key frame registering unit 1002 assigns "latest" as a pointer to the n-th key frame and adds a deletion prevention flag to the n-th key frame. At this time, it is assumed that "prev1" is assigned to an (n−1)-th key frame as a pointer pointing the key frame and "prev2" is assigned to an (n−2)-th key frame as a pointer pointing the key frame. It is also assumed that a deletion prevention flag is also added to the (n−1)-th key and the (n−2)-th key frame.

Then, the key frame registering unit 1002 determines whether a distance between the position of the key frame pointed by "prev2" and the position of the key frame pointed by "latest" is equal to or greater than a predetermined distance (Step S11). When the distance between the position of the key frame pointed by "preve2" and the position of the key frame pointed by "latest" is less than the predetermined distance (NO in Step S11), the key frame registering unit 1002 then determines whether an angle between the posture of the key frame pointed by "prev2" and the posture of the key frame pointed by "latest" is equal to or greater than a predetermined angle (Step S12).

When the angle between the posture of the key frame pointed by "prev2" and the posture of the key frame pointed by "latest" is less than the predetermined angle (NO in Step S12), the key frame registering unit 1002 then determines whether the current key frame is the key frame pointed by "prev1" (Step S13).

When the current key frame is the key frame pointed by "prev1" (YES in Step S13), differences in distance and angle between "prev2" and "latest" are small and the current key frame with a relationship close to the key frame of "latest" is "prev1," and thus a likelihood of a great influence of the thinning (the forklift is lost, or the like) is low even when the key frame pointed by "prev1" is thinned out.

Accordingly, when three conditions which are described above are all satisfied (NO in Step S11, NO in Step S12, and YES in Step S13), the self-localization device 10 removes the deletion prevention flag which is added to the key frame of "prev1" and replaces the pointer of the key frame pointed by "latest" with "prev1" (Step S14). Thereafter, the key frame registering unit 1002 registers a next key frame and assigns a pointer of "latest" to the key frame (Step S15).

On the other hand, when any one of the three conditions is not satisfied (YES in Step S11, YES in Step S12, or NO in Step S13) and the key frame pointed by "prev1" is thinned out, the distance (or the angle) interval between the key frame "prev2" and the key frame of "latest" increases greatly, and it is conceivable that there is a likelihood of a great influence (the forklift 1 is lost, or the like). Therefore, in this case, the key frame registering unit 1002 does not remove the deletion prevention flag of "prev1," but replaces the pointer of the key frame pointed by "latest" with "prev1" and replaces the pointer of the key frame pointed by "prev1" with "prev2" (Step S16).

Thereafter, the key frame registering unit 1002 registers a next key frame and assigns a pointer of "latest" to the key frame (Step S17).

The key frame registering unit 1002 repeatedly performs the processes of Steps S11 to S17 until the process of preparing a map ends (Step S18).

As described above, the key frame registering unit 1002 according to the modified example of the first embodiment performs a process of thinning out a plurality of registered key frames on the basis of whether there is a deletion prevention flag. Then, regarding a target key frame (prev1) to which it is determined whether a deletion prevention flag is to be added, the key frame registering unit 1002 determines whether a deletion prevention flag is to be added to the target key frame on the basis of a relationship in position and posture between the key frame (prev2) which is registered previous to the target key frame and the key frame (latest) which is registered subsequent to the target key frame.

With this configuration, since a deletion prevention flag is set in a key frame which will likely to have a great influence on a density of key frames, it is possible to secure an appropriate density of key frames depending on the position and the posture of the forklift 1 even after the thinning process has been performed.

The order of the determination process of Steps S11 to S13 can be appropriately changed, and the present disclosure is not limited to the order illustrated in FIG. 8 in another embodiment. In another embodiment, all of Steps S11 to S13 do not need to be performed and the above-mentioned advantages can be achieved by performing at least one of Steps S11 and S13.

Second Embodiment

Hereinafter, a self-localization device according to a second embodiment and a mobile object including the self-localization device will be described with reference to FIGS. 9 and 10.

Process of Map Reading Unit

Figure 9:
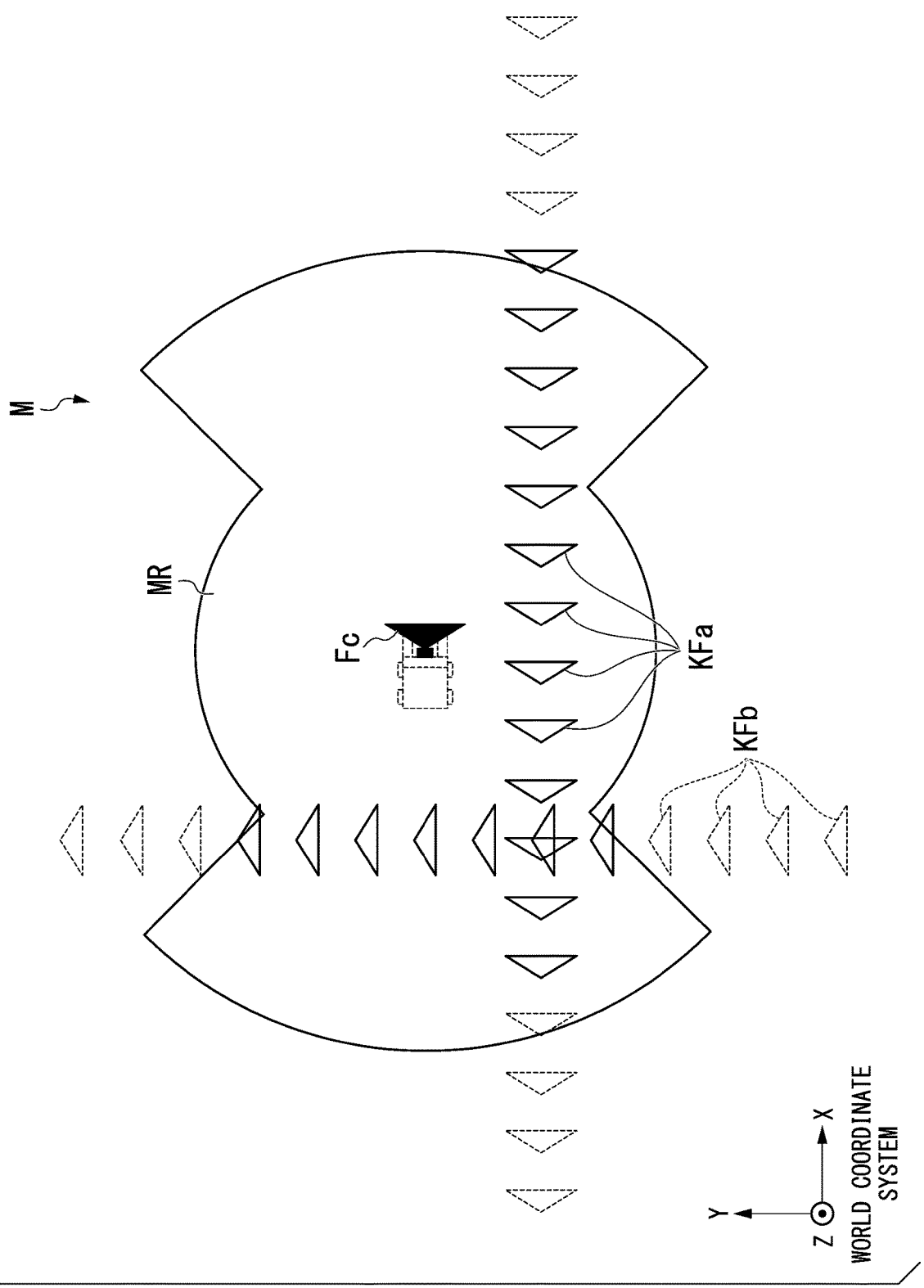
FIG. 9 is a diagram illustrating a process which is performed by a map reading unit according to a second embodiment.

FIG. 9 is a diagram illustrating a process which is performed by a map reading unit according to the second embodiment.

The second embodiment is different from the first embodiment, in that the map reading unit 1003 according to the first embodiment loads (reads) the whole area of the map M onto the memory 101 at the time of actual operation, but the map reading unit 1003 according to the second embodiment reads a partial area of the map M onto the memory.

At the time of actual operation, the map reading unit 1003 according to the second embodiment loads only key frames belonging to a predetermined area (a reading area MR) based on the position of the forklift 1 which is estimated in the self-localization process based on ORB-SLAM onto the memory 101. In FIG. 9, when the position of the forklift 1 moves, the map reading unit 1003 defines a new reading area MR based on the position at that time (a position which is estimated on the basis of a captured image Fc) and loads key frames KFa belonging to the reading area MR onto the memory 101. Then, the map reading unit 1003 unloads key frames KFb not belonging to the reading area MR from the memory 101.

With this configuration, since only minimum key frames required for the self-localization process based on the current position of the forklift 1 are loaded onto the memory 101, it is possible to save an area of usage of the memory 101 while maintaining accuracy of the self-localization process.

As illustrated in FIG. 9, the reading area MR according to the second embodiment has a shape which is broader in the front-rear direction of the forklift 1 (an X-axis direction in the example illustrated in FIG. 9) than in the width direction of the forklift 1 (a Y-axis direction in the example illustrated in FIG. 9) (a shape in which a fan-like shapes are combined with a circular shape centered on the current position of the forklift 1 in the front-rear direction of the forklift 1 as illustrated in FIG. 9). Although the forklift 1 may move in the front-rear direction for a short time, many feature points in the front-rear direction are loaded by employing the above-mentioned shape. Accordingly, when the forklift 1 moves in the front-rear direction, it is possible to prevent shortage of the feature points to be matched on the map M.

In another embodiment, the reading area MR is not limited to the above-mentioned shape, and may be defined in a circular shape or a rectangular shape based (centered) on the position of the forklift 1.

Modified Example of Second Embodiment

Figure 10:
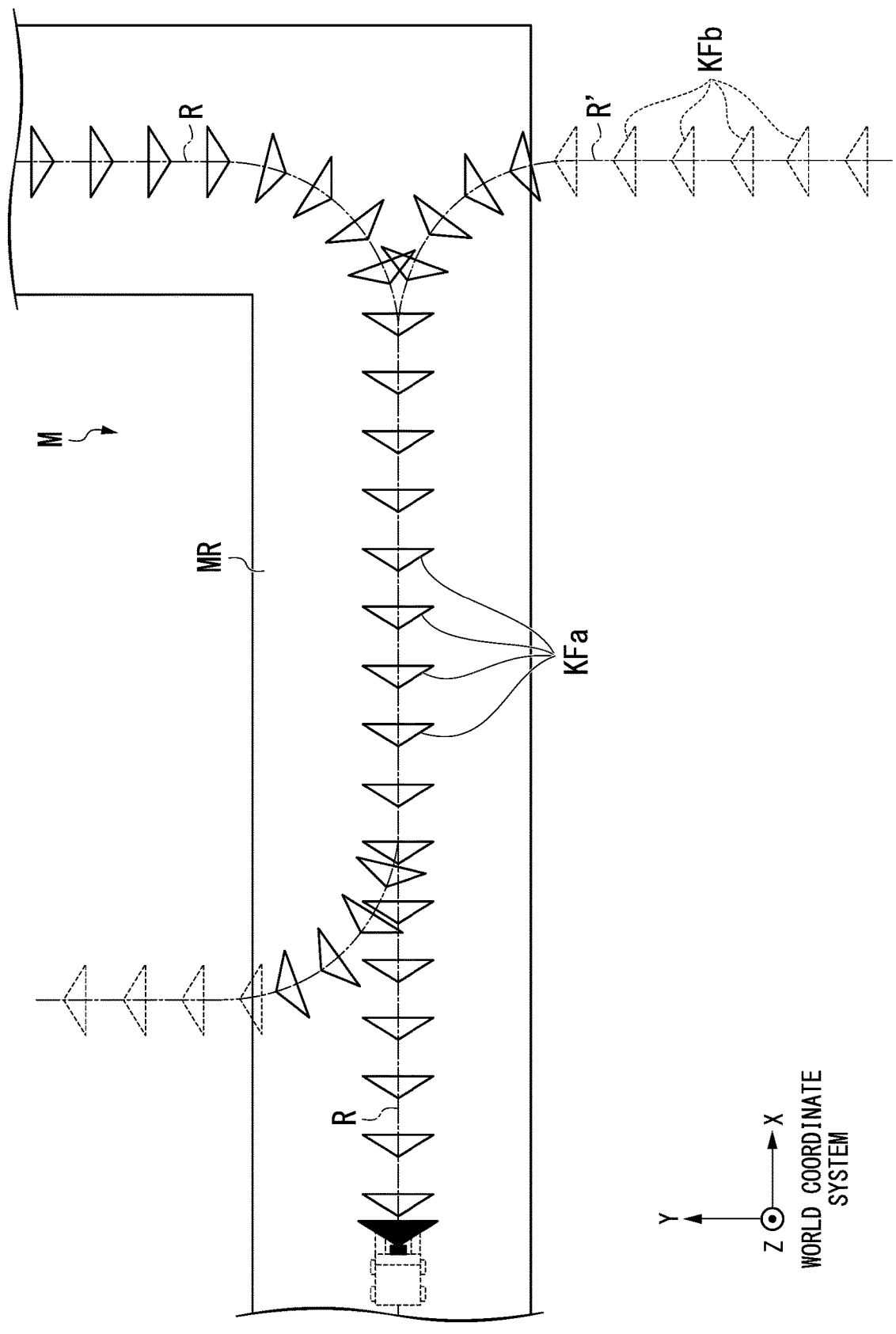
FIG. 10 is a diagram illustrating a process which is performed by a map reading unit according to a modified example of the second embodiment.

FIG. 10 is a diagram illustrating a process which is performed by the map reading unit according to the second embodiment.

At the time of actual operation, the map reading unit 1003 according to the modified example of the second embodiment loads only key frames belonging to a reading area MR corresponding to a specific traveling route onto the memory 101. In FIG. 10, the reading area MR is defined to correspond to a traveling route R. When a traveling route (for example, the traveling route R) on which the forklift 1 is scheduled to travel changes, the map reading unit 1003 changes the reading area MR to a reading area corresponding to the changed traveling route (for example, a traveling route R').

Similarly to the second embodiment, the map reading unit 1003 loads key frames KFa belonging to the reading area MR onto the memory 101 and unloads key frames KFb not belonging to the reading area MR from the memory 101.

With this configuration, since only minimum key frames required for the self-localization process based on the current position of the forklift 1 are loaded onto the memory 101, it is possible to save an area of use of the memory 101 while maintaining accuracy of the self-localization process.

A specific traveling route may be determined depending on a destination or a type of a task of the forklift 1. For example, in the vicinity of a production line in which boxes having products accommodated therein are placed on pallets, (1) a task of carrying an empty pallet to the production line and (2) a task of carrying a pallet having products from the production line to a product warehouse and temporarily placing are performed. At the time of starting the task of (1), the map reading unit 1003 loads only key frames corresponding to a traveling route from a place in which pallets are piled to the production line. When the task of (2) is then performed, the map reading unit 1003 unloads the key frames loaded in the task of (1) and newly loads key frames corresponding to a traveling route from the production line to the warehouse.

Third Embodiment

Hereinafter, a self-localization device according to a third embodiment and a mobile object including the self-localization device will be described with reference to FIGS. 11 and 12.

Figure 11:
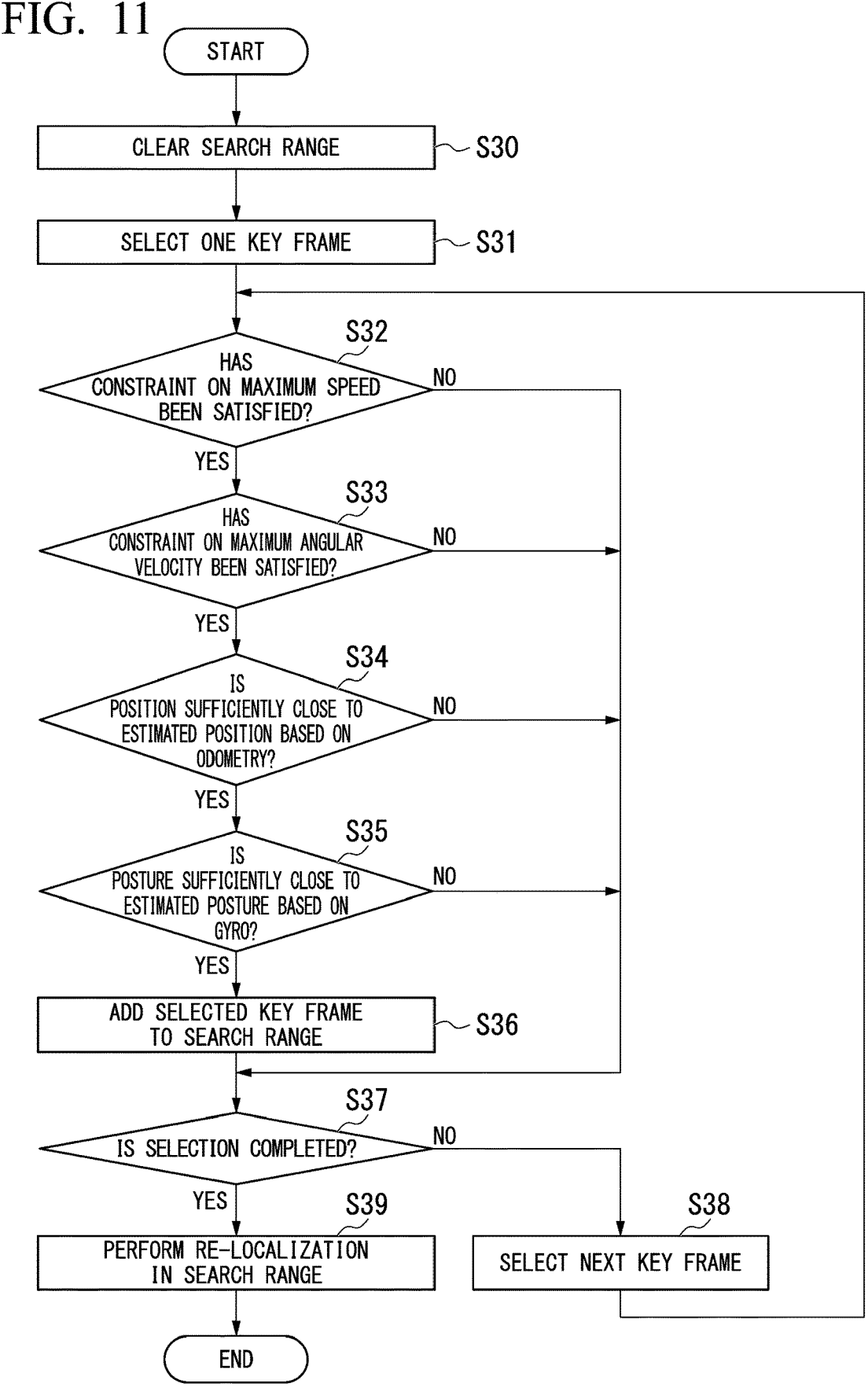
FIG. 11 is a flowchart illustrating a process flow which is performed by a re-localization processing unit according to a third embodiment.

Process of re-localization processing unit FIG. 11 is a diagram illustrating a process flow which is performed by a re-localization processing unit according to the third embodiment.

Figure 12:
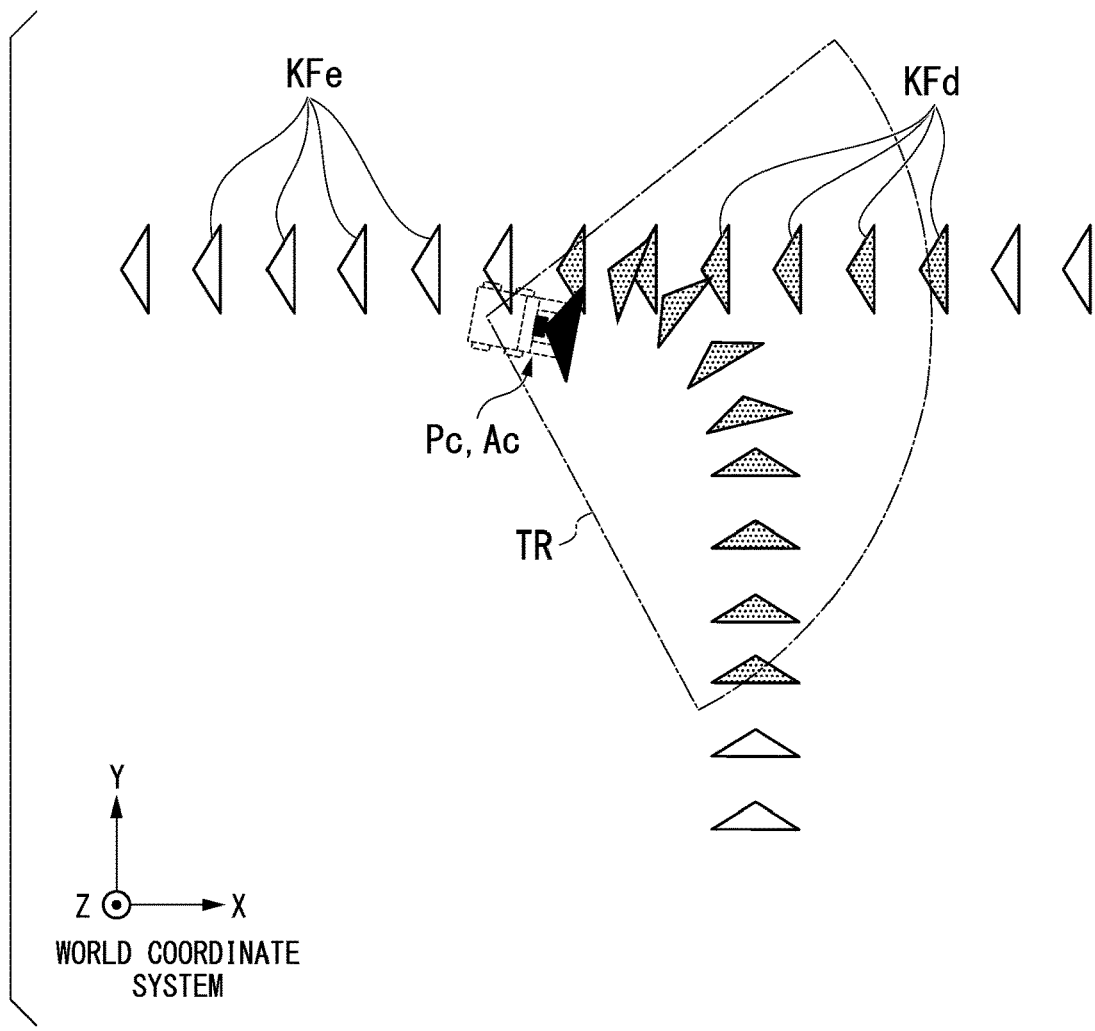
FIG. 12 is a diagram illustrating a process which is performed by the re-localization processing unit according to the third embodiment.

FIG. 12 is a diagram illustrating a process which is performed by the re-localization processing unit according to the third embodiment.

The re-localization processing unit 1004 according to the third embodiment identifies a range in which key frames are searched (hereinafter simply referred to as a search range) on the basis of hardware constraints on the forklift 1 and searches for key frames belonging to the search range. The process flow illustrated in FIG. 11 illustrates a process flow of a re-localization process which is performed by the re-localization processing unit 1004 according to the third embodiment when the self-localization process has failed (the forklift is lost) at the time of preparation of a map or at the time of actual operation.

As illustrated in FIG. 11, first, the re-localization processing unit 1004 of the self-localization device 10 clears the search range of key frames (Step S30).

Then, the re-localization processing unit 1004 selects one of all the key frames registered in the key frame table (FIG. 3) (Step S31).

Then, the re-localization processing unit 1004 determines whether the key frame selected in Step S31 is present in a range satisfying a constraint on a maximum speed of the forklift 1 with respect to the position of the forklift which has been estimated immediately before the forklift 1 has been lost (Step S32).

When the selected key frame is present in the range satisfying the constraint on a maximum speed of the forklift 1 (YES in Step S32), the re-localization processing unit 1004 then determines whether the selected key frame is present in a range satisfying a constraint on a maximum angular velocity of the forklift 1 with respect to the posture of the forklift which has been estimated immediately before the forklift 1 has been lost (Step S33).

When the selected key frame is present in the range satisfying the constraint on the maximum angular velocity of the forklift 1 (YES in Step S33), the re-localization processing unit 1004 then determines whether a position of the selected key frame is sufficiently close to an estimated position based on odometry (Step S34). Here, the estimated position based on odometry is a position of the forklift 1 which is estimated using the results of detection from the tire rotational angle sensor 12 (FIG. 1) and the steering angle sensor 13 (FIG. 1) which are mounted in the forklift 1. The re-localization processing unit 1004 estimates a self-position based on the results of detection from the tire rotational angle sensor 12 (FIG. 1) and the steering angle sensor 13 (FIG. 1) on the basis of the position of the forklift which has been estimated on the basis of ORB-SLAM immediately before the forklift has been lost.

When the position of the selected key frame is sufficiently close to the estimated position based on odometry (YES in Step S34), the re-localization processing unit 1004 then determines whether a posture of the selected key frame is sufficiently close to a posture estimated by the gyro sensor 14 (FIG. 1) (Step S35). The posture estimated by the gyro sensor 14 is an estimated posture of the forklift 1 which is obtained, for example, by integrating an angular velocity detected by the gyro sensor 14.

When the position of the selected key frame is sufficiently close to a position estimated by the gyro sensor 14 (YES in Step S34), the re-localization processing unit 1004 adds the selected key frame to the search range (Step S36).

On the other hand, when any one of the determination results of Steps S32 to S35 is NO, the re-localization processing unit 1004 does not add the selected key frame to the search range and performs a next step.

The re-localization processing unit 1004 determines whether all the key frames registered in the key frame table have been selected and the processes of Steps S32 to S36 have been performed thereon (Step S37).

When all the key frames have not been selected (NO in Step S37), the re-localization processing unit 1004 selects a next key frame (Step S38) and performs the processes of Steps S32 to S36 on the key frame.

When all the key frames have been selected (YES in Step S37), the re-localization processing unit 1004 performs re-localization on only the key frames which are added to the search range (Step S39).

The search range TR illustrated in FIG. 12 is an area in which the determination processes of Steps S32 to S38 are satisfied. That is, by performing the determination processes of Steps S32 to S38, the re-localization processing unit 1004 sets key frames KFd belonging to the search range TR which is defined by hardware constraints as search objects in the re-localization and does not set key frames KFe not belonging to the search range TR as search objects on the basis of the position Pc and the posture Ac which are estimated using ORB-LSAM immediately before the forklift has been lost.

As described above, the re-localization processing unit 1004 according to the third embodiment identifies a range which can be taken as a current position of the forklift 1 as a search range for key frames using a position which is estimated at last in the self-localization process and a maximum speed which is one hardware constraint of the forklift 1.

The re-localization processing unit 1004 according to the third embodiment identifies a range which can be taken as a current posture of the forklift 1 as a search range for key frames using a posture which is estimated at last in the self-localization process and a maximum angular velocity which is one hardware constraint of the forklift 1.

The re-localization processing unit 1004 according to the third embodiment identifies a range which is sufficiently close to the estimated position based on odometry (the tire rotational angle sensor 12 and the steering angle sensor 13) (that is, a range which can be considered to be an error of the estimated position based on odometry) as a search range for key frames.

The re-localization processing unit 1004 according to the third embodiment identifies a range which is sufficiently close to the posture estimated by the gyro sensor 14 (that is, a range which can be considered to be an error of the posture estimated by the gyro sensor 14) as a search range for key frames.

With this configuration, since a key frame with a position and a posture which are apparently out of the hardware constraints of the forklift 1 can be excluded from the search objects for re-localization, it is possible to achieve an increase in efficiency and an increase in speed of the re-localization process.

The order of the determination process of Steps S32 to S35 can be appropriately changed, and the present disclosure is not limited to the order illustrated in FIG. 11 in another embodiment. In another embodiment, all of Steps S32 to S35 do not need to be performed and the above-mentioned advantages can be achieved by performing at least one of Steps S32 and S35.

Fourth Embodiment

Hereinafter, a self-localization device according to a fourth embodiment and a mobile object including the self-localization device will be described with reference to FIG. 13.

Process of Self-Localization Processing Unit

Figure 13:
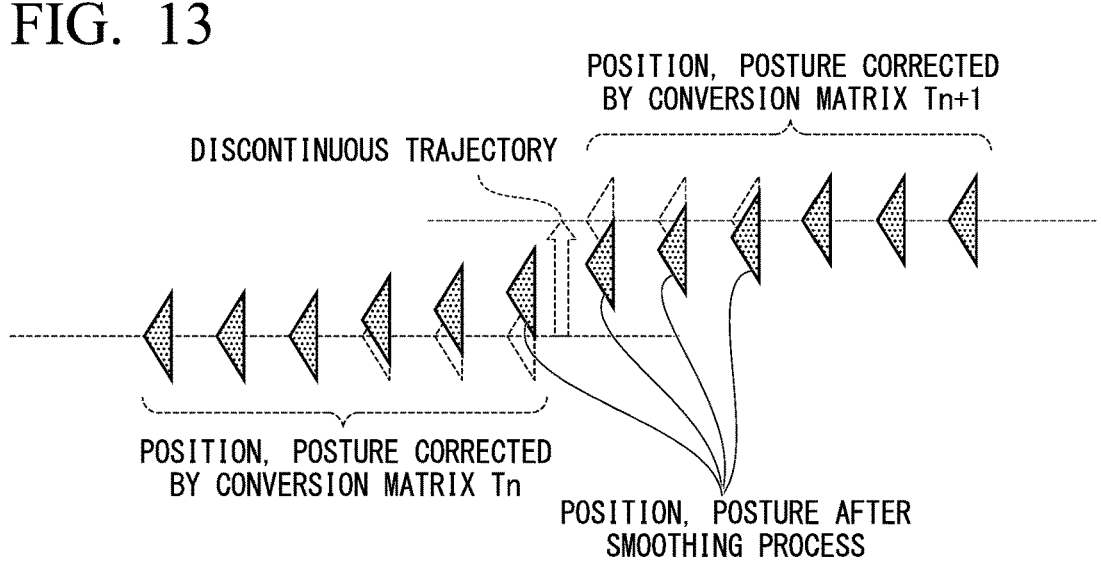
FIG. 13 is a diagram illustrating a function of a self-localization processing unit according to a fourth embodiment.

FIG. 13 is a diagram illustrating a function of a self-localization processing unit according to the fourth embodiment.

The self-localization processing unit 1001 according to the fourth embodiment corrects a position and a posture which are estimated through the self-localization process such that trajectories of the position and the posture of the forklift 1 are smoothed.

With reference to FIG. 7, it has been described above that the self-localization processing unit 1001 calculates the position Pa and the posture Aa with higher accuracy by multiplying the result of the self-localization process based on ORB-SLAM (the position Pa' and the posture Aa') by the conversion matrix Tn correlated with the current key frame (the key frame KFn).

In this case, the following problems may occur. That is, a conversion matrix Tn correlated with a key frame KFn and a conversion matrix Tn+1 correlated with a key frame KFn+1 are different conversion matrices. During movement of the forklift 1, the current key frame which is used for the self-localization process is switched from the key frame KFn to the key frame KFn+1, for example, at a certain position. Then, with the switching of the current key frame, the conversion matrix which is used to correct a deviation from a true value is switched from the conversion matrix Tn to the conversion matrix Tn+1. In this case, for example, as illustrated in FIG. 13, a leap may occur between the position and the posture corrected by the conversion matrix Tn and the position and the posture corrected by the conversion matrix Tn+1 and a discontinuous trajectory may be obtained.

Therefore, the self-localization processing unit 1001 according to this embodiment performs a predetermined smoothing process on the position and the posture which are estimated through the self-localization process. The self-localization processing unit 1001 outputs the position and the posture which are acquired through the smoothing process as the position and the posture of the forklift 1. This smoothing process can be provided, for example, using a moving average filter.

With this configuration, the estimated self-position draws a continuous trajectory. Accordingly, a sudden change in a steering angle can be prevented in the forklift 1 that performs automatic steering on the basis of the estimation result of the position and the posture.

Modified Example of Embodiments

While the self-localization devices 10 according to the first to fourth embodiments and the mobile objects (the forklifts 1) including the self-localization device 10 have been described above in detail, the specific aspects of the self-localization devices 10 and the mobile objects are not limited to the above description and various modifications in design or the like can be made thereon without departing from the gist.

For example, a mobile object to which the self-localization device 10 can be applied is not limited to a forklift and may be applied to an unmanned aircraft (a drone) or the like. In this case, the self-localization device 10 may receive an input of a detection value from an acceleration sensor or a gyro sensor which is mounted in a drone and register a current sight image as a key frame when the detection value satisfies a prescribed condition.

In the above-mentioned embodiments, various processes of the self-localization device 10 are stored in a computer-readable recording medium in the form of a program and the various processes are performed by causing a computer to read and execute the program. Examples of the computer-readable recording medium include a magnetic disk, a magneto-optical disk, a CD-ROM, a DVD-ROM, and a semiconductor memory. The computer program may be transmitted to a computer via a communication line and the computer having received the computer program may execute the computer program.

The program may be for realizing some of the above-mentioned functions. The program may be a program which can realize the functions in combination with a program which is recorded in advance in a computer system, that is, a so-called differential file (a differential program).

According to a second aspect of the present disclosure, the registration unit may be configured to register the sight image as a key frame when a distance between the position of the mobile object and one key frame associated with the position is equal to or greater than a predetermined distance threshold value.

According to a third aspect of the present disclosure, the registration unit may be configured to register the sight image as a key frame when an angular velocity of the mobile object during movement is equal to or greater than a predetermined angular velocity threshold value.

According to a fourth aspect of the present disclosure, the registration unit may be configured to perform a thinning process on the plurality of registered key frames on the basis of whether there is a deletion prevention flag. The registration unit may be configured to determine whether the deletion prevention flag is to be added to a target key frame which is one of the plurality of key frames on the basis of a relationship of at least one of a position and a posture between a key frame which is registered previous to the target key frame and a key frame which is registered subsequent to the target key frame.

According to a fifth aspect of the present disclosure, the self-localization device may further include a reading unit configured to read a partial area of the map onto a memory.

According to a sixth aspect of the present disclosure, the reading unit may be configured to read the partial area based on the position of the mobile object on the map onto the memory.

According to a seventh aspect of the present disclosure, the reading unit may be configured to read the partial area which is broader in a front-rear direction of the mobile object than in a width direction of the mobile object on the map onto the memory.

According to an eighth aspect of the present disclosure, the reading unit may be configured to read the partial area corresponding to a specific traveling route on the map onto the memory.

According to a ninth aspect of the present disclosure, the self-localization device may further include a processing unit configured to perform re-localization of searching for the key frame when the self-localization process fails. The processing unit may be configured to identify a search range on the basis of constraints on hardware of the mobile object and to search for key frames included in the search range.

According to a tenth aspect of the present disclosure, the processing unit may be configured to identify a range which is to be taken as a current position of the mobile object as the search range on the basis of the position estimated in the self-localization process and a maximum speed of the mobile object.

According to an eleventh aspect of the present disclosure, the processing unit may be configured to identify a range which is to be taken as a current position of the mobile object as the search range on the basis of the posture estimated in the self-localization process and a maximum angular velocity of the mobile object.

According to a twelfth aspect of present disclosure, the processing unit may be configured to identify a range which is to be considered as an error of an estimated position based on odometry with respect to the position estimated in the self-localization process as the search range.

According to a thirteenth aspect of the present disclosure, the processing unit may be configured to identify a range which is to be considered as an error of an estimated posture based on a gyro sensor with respect to the posture estimated in the self-localization process as the search range.

According to a fourteenth aspect of the present disclosure, the estimation unit may be configured to correct the position and the posture estimated in the self-localization process such that trajectories of the position and the posture of the mobile object in the world coordinate system are smoothed.

According to a fifteenth aspect of the present disclosure, the estimation unit may be configured to correct the position and the posture estimated in the self-localization process using a moving average filter.

According to a sixteenth aspect of the present disclosure, there is provided a self-localization method including: a step of acquiring a sight image from a camera which is mounted in a mobile object; a step of performing a self-localization process of estimating a position and a posture of the mobile object in a world coordinate system on the basis of positions of feature points in the sight image and a map on which positions of a plurality of feature points in the world coordinate system are recorded; and a step of registering the sight image as a key frame for adding a new feature point included in the sight image to the map. The step of registering the sight image as the key frame includes registering the sight image as the key frame when movement of the mobile object satisfies a condition which is prescribed for at least one of the position and the posture of the mobile object.

According to a seventeenth aspect of the present disclosure, there is provided a non-transitory computer-readable medium that stores a program causing a computer of a self-localization device to perform: a step of acquiring a sight image from a camera which is mounted in a mobile object; a step of performing a self-localization process of estimating a position and a posture of the mobile object in a world coordinate system on the basis of positions of feature points in the sight image and a map on which positions of a plurality of feature points in the world coordinate system are recorded; and a step of registering the sight image as a key frame for adding a new feature point included in the sight image to the map. The step of registering the sight image as the key frame includes registering the sight image as the key frame when movement of the mobile object satisfies a condition which is prescribed for at least one of the position and the posture of the mobile object.

While some embodiments of the present disclosure have been described and illustrated above, it should be understood that these are exemplary of the present disclosure and are not to be considered as limiting the scope of the present disclosure. These embodiments can be modified in various forms, and omissions, substitutions, and other modifications can be made without departing from the gist of the present disclosure. Accordingly, the embodiments and modifications thereof belong to the scope of the present disclosure described in the appended claims and an equivalent range thereof in the same way as belonging to the scope or gist of the present disclosure.

REFERENCE SIGNS LIST

1 Forklift (mobile object)
10 Self-localization device
100 CPU
1000 Sight image acquiring unit (acquisition unit)
1001 Self-localization processing unit (estimation unit)
1002 Key frame registering unit (registration unit)
1003 Map reading unit (reading unit)
1004 Re-localization processing unit (processing unit)
101 Memory
102 Storage
103 Communication interface
11 Camera
12 Tire rotational angle sensor
13 Steering angle sensor
14 Gyro sensor
M Map

The invention claimed is:

1. A self-localization device comprising:
an acquisition unit configured to acquire a sight image from a camera which is mounted in a mobile object;
an estimation unit configured to perform a self-localization process of estimating a position and a posture of the mobile object in a world coordinate system on the basis of positions of feature points in the sight image and a map on which positions of a plurality of feature points in the world coordinate system are recorded; and a registration unit configured to register the sight image as a key frame for adding a new feature point included in the sight image to the map,
wherein the registration unit is configured to register the sight image as the key frame when movement of the mobile object satisfies a condition which is prescribed for at least one of the position and the posture of the mobile object, and
wherein the registration unit is configured to register the sight image as a key frame when a distance between the position of the mobile object and one key frame associated with the position is equal to or greater than a predetermined distance threshold value.

2. The self-localization device according to claim 1, wherein the registration unit is configured to register the sight image as a key frame when an angular velocity of the mobile object during movement is equal to or greater than a predetermined angular velocity threshold value.

3. The self-localization device according to claim 1, wherein the registration unit is configured to perform a thinning process on a plurality of key frames registered by the registration unit on the basis of whether there is a deletion prevention flag, and
wherein the registration unit is configured to determine whether the deletion prevention flag is to be added to a target key frame which is one of the plurality of key frames on the basis of a relationship in at least one of a position and a posture between a key frame which is registered previous to the target key frame and a key frame which is registered subsequent to the target key frame.

4. The self-localization device according to claim 1, further comprising a reading unit configured to read a partial area of the map onto a memory.

5. The self-localization device according to claim 4, wherein the reading unit is configured to read the partial area based on the position of the mobile object on the map onto the memory.

6. The self-localization device according to claim 5, wherein the reading unit is configured to read the partial area which is broader in a front-rear direction of the mobile object than in a width direction of the mobile object on the map onto the memory.

7. The self-localization device according to claim 4, wherein the reading unit is configured to read the partial area corresponding to a specific traveling route on the map onto the memory.

8. The self-localization device according to claim 1, further comprising a processing unit configured to perform re-localization of searching for the key frame when the self-localization process fails,
wherein the processing unit is configured to identify a search range on the basis of constraints on hardware of the mobile object and to search for key frames included in the search range.

9. The self-localization device according to claim 8, wherein the processing unit is configured to identify a range which is to be taken as a current position of the mobile object as the search range on the basis of the position estimated in the self-localization process and a maximum speed of the mobile object.

10. The self-localization device according to claim 8, wherein the processing unit is configured to identify a range which is to be taken as a current position of the mobile object as the search range on the basis of the posture estimated in the self-localization process and a maximum angular velocity of the mobile object.

11. The self-localization device according to claim 8, wherein the processing unit is configured to identify a range which is to be considered as an error of an estimated position based on odometry with respect to the position estimated in the self-localization process as the search range.

12. The self-localization device according to claim 8, wherein the processing unit is configured to identify a range which is to be considered as an error of an estimated posture based on a gyro sensor with respect to the posture estimated in the self-localization process as the search range.

13. The self-localization device according to claim 1, wherein the estimation unit is configured to correct the position and the posture estimated in the self-localization process such that trajectories of the position and the posture of the mobile object in the world coordinate system are smoothed.

14. The self-localization device according to claim 13, wherein the estimation unit is configured to correct the position and the posture estimated in the self-localization process using a moving average filter.

15. A self-localization method comprising:
a step of acquiring a sight image from a camera which is mounted in a mobile object;
a step of performing a self-localization process of estimating a position and a posture of the mobile object in a world coordinate system on the basis of positions of feature points in the sight image and a map on which positions of a plurality of feature points in the world coordinate system are recorded; and
a step of registering the sight image as a key frame for adding a new feature point included in the sight image to the map,
wherein the step of registering the sight image as the key frame includes registering the sight image as the key frame when movement of the mobile object satisfies a condition which is prescribed for at least one of the position and the posture of the mobile object, and
wherein the step of registering the sight image as the key frame includes registering the sight image as a key frame when a distance between the position of the mobile object and one key frame associated with the position is equal to or greater than a predetermined distance threshold value.

16. A non-transitory computer-readable medium that stores a program causing a computer of a self-localization device to perform:
a step of acquiring a sight image from a camera which is mounted in a mobile object;
a step of performing a self-localization process of estimating a position and a posture of the mobile object in a world coordinate system on the basis of positions of feature points in the sight image and a map on which positions of a plurality of feature points in the world coordinate system are recorded; and
a step of registering the sight image as a key frame for adding a new feature point included in the sight image to the map,
wherein the step of registering the sight image as the key frame includes registering the sight image as the key frame when movement of the mobile object satisfies a condition which is prescribed for at least one of the position and the posture of the mobile object, and
wherein the step of registering the sight image as the key frame includes registering the sight image as a key frame when a distance between the position of the mobile object and one key frame associated with the position is equal to or greater than a predetermined distance threshold value.

\* \* \* \* \*